(No Model.)
J. E. VINCENT.
COMBINED WRENCH AND THILL SUPPORT.
No. 554,846. Patented Feb. 18, 1896.
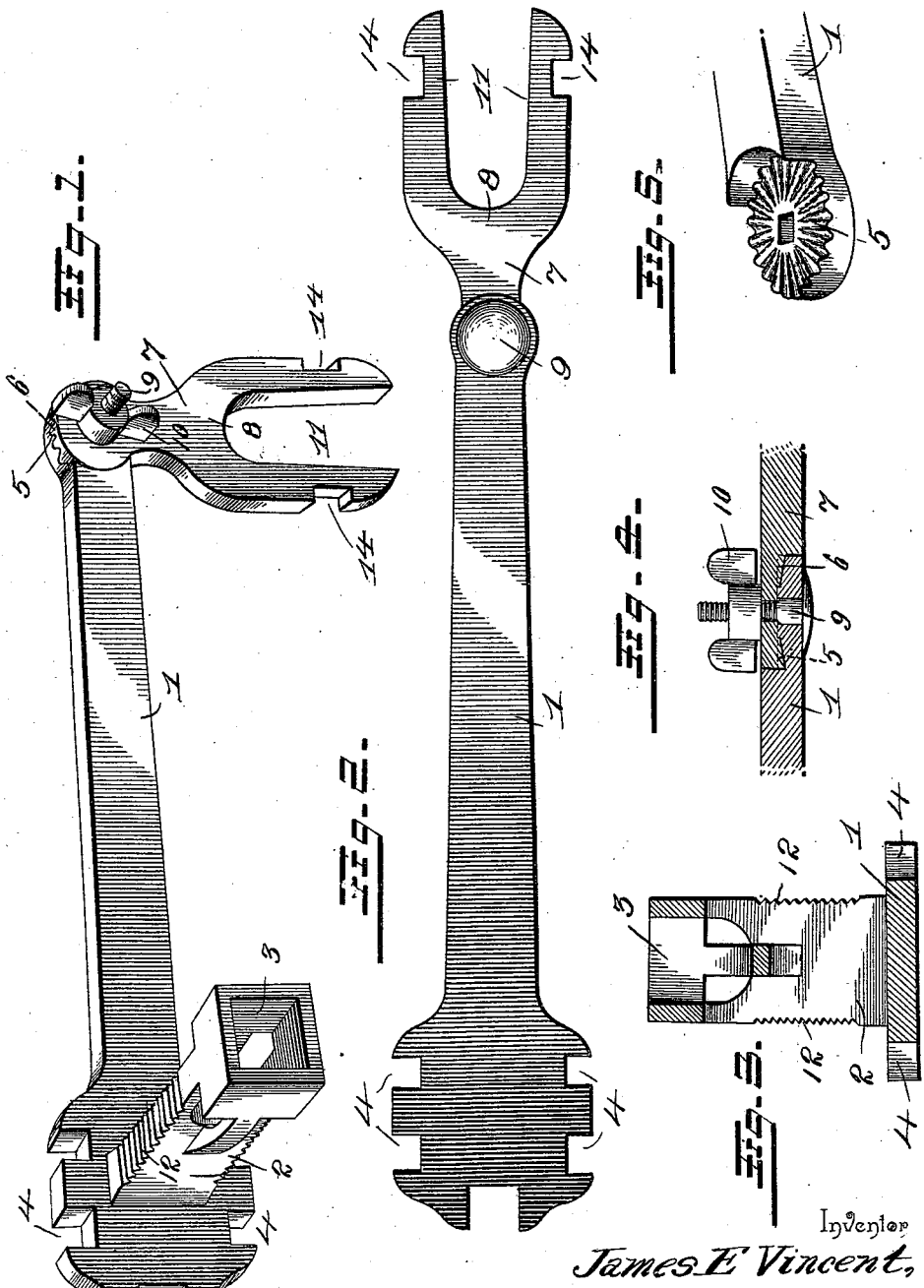

# UNITED STATES PATENT OFFICE.

JAMES EDWIN VINCENT, OF COLUMBIA, TENNESSEE.

COMBINED WRENCH AND THILL-SUPPORT.

SPECIFICATION forming part of Letters Patent No. 554,846, dated February 18, 1896.

Application filed November 5, 1895. Serial No. 568,036. (No model.)

*To all whom it may concern:*

Be it known that I, JAMES EDWIN VINCENT, a citizen of the United States, residing at Columbia, in the county of Maury and State of Tennessee, have invented a new and useful Combined Nut-Wrench and Support for Shafts and Tongues, of which the following is a specification.

The invention relates to improvements in combined nut-wrenches and supports for shafts and tongues.

The object of the present invention is to provide a simple and inexpensive device adapted to be readily applied to and detached from a vehicle and capable of supporting the shaft or tongue thereof, and also adapted when not in use as a thill or tongue holder to be used as a nut-wrench.

The invention consists in the construction and novel combination and arrangement of parts hereinafter fully described, illustrated in the accompanying drawings, and pointed out in the claims hereto appended.

In the drawings, Figure 1 is a perspective view of a combined shaft-support and nut-wrench constructed in accordance with this invention. Fig. 2 is an elevation showing the opposite side of the same. Fig. 3 is a detail sectional view of the axle-nut socket. Fig. 4 is a similar view of the joint. Fig. 5 is a detail perspective view of one of the sections of the joint.

Like numerals of reference designate corresponding parts in all the figures of the drawings.

1 designates a shank or bar provided at its front end with an arm 2 arranged at right angles to the shank or bar and terminating in an axle-nut socket 3. The outer end of the shank or bar 1 is also provided with an enlargement or head having nut-receiving recesses 4 at the edges thereof, and the arm 2 is preferably provided at the inner end of the axle-nut socket with openings to permit grease and other accumulation to readily escape from the socket. The inner end of the shank or bar 1 is recessed and provided at its inner face with serrations 5, which are adapted to interlock with corresponding serrations 6 of the arm 7 of an axle-engaging member 8. The arm 7 is recessed to correspond to the recessed portion of the shank or bar 1, and the recessed portions form a pair of ears which are perforated for the reception of a bolt 9. The bolt 9 is provided with a thumb-nut 10, and has a polygonal portion adjacent to its head, which polygonal portion fits in the corresponding perforation to prevent the bolt from rotating when the nut is being turned. The serrated faces of the perforated ears are locked in engagement by the nut 10, and the shank or bar 1 is secured at any desired angle to the axle-engaging member 8.

The axle-engaging member is provided with opposite sides 11, which form an axle-receiving recess, and which are adapted to straddle an axle and to be readily engaged with and removed from the same, and the upper portion of the space between the sides 11 is rounded to conform to the rounded portion of an axle-bed. When the axle-engaging member 8 is applied to an axle, the arm 7 extends vertically therefrom, and the shank or bar 1 projects forward with its arm disposed horizontally and adapted to be arranged beneath a shaft or tongue to support the same at any desired elevation. The edges of the arm 2 are provided with serrations 12 to prevent a shaft or thill from slipping or jarring off the support.

The sides 11 of the axle-engaging device are provided with nut-receiving recesses 14, and the recesses 14 and 4 by their varied positions enable the device to be advantageously arranged with relation to the nut to be removed.

It will be seen that the axle-engaging member is adapted to be readily placed on an axle and can be quickly removed therefrom, and that when mounted on an axle the arm 2 is disposed horizontally in position to receive and support the adjacent thill or a tongue, and that when the device is not in use it may be conveniently carried in the vehicle. It will also be apparent that the device is adapted to hold a thill or tongue at any desired angle, and that after an axle-nut has been removed it is capable of supporting the nut above the ground out of contact with the same to prevent dirt getting into the nut, as the shank or bar 1, when laid flat upon the ground, will provide a base sufficiently broad to prevent the device, while holding the nut, from turning over.

Changes in the form, proportion, and minor details of construction may be resorted to without departing from the principle or sacrificing any advantages of the invention.

What I claim is—

1. A device of the class described, comprising an axle-engaging member, a shank or bar pivotally connected to the shaft-engaging member and provided with means for securing it at the desired adjustment, and an arm extending laterally from the shank or bar and adapted to support a thill, and provided with a nut-receiving socket, substantially as described.

2. A device of the class described, comprising an axle-engaging member provided with opposite sides, and adapted to straddle an axle, a shank or bar pivotally and adjustably secured to the shaft-engaging member, and a thill-supporting arm extending laterally from the shank or bar 1 and provided with a socket, substantially as described.

3. In a device of the class described, comprising an axle-engaging member having opposite sides forming an axle-receiving recess and adapted to straddle an axle, said axle-engaging member being provided at the outer edges of the sides with nut-receiving recesses and having an arm 7 provided with a perforated ear, a shank or bar having a head at one end and provided thereat with nut-receiving recesses and provided at its other end with a perforated ear interlocking with the said ear, a fastening device passing through the perforated ears and pivoting the shank or bar to the axle-engaging member, and an arm 2 projecting from the front end of the shank or bar and arranged at right angles thereto and terminating in a nut-receiving socket, substantially as described.

In testimony that I claim the foregoing as my own I have hereto affixed my signature in the presence of two witnesses.

JAMES EDWIN VINCENT.

Witnesses:
T. G. WETHERSPOON,
G. W. HAYES.